United States Patent [19]

Robison et al.

[11] Patent Number: 5,029,313

[45] Date of Patent: Jul. 2, 1991

[54] PHOTOFINISHING APPARATUS WITH FILM INFORMATION EXCHANGE SYSTEM USING DEDICATED MAGNETIC TRACKS ON FILM

[75] Inventors: Gary L. Robison, Rochester; Michael L. Wash, Pittsford, both of N.Y.

[73] Assignee: Eastman Kodak Company, Rochester, N.Y.

[21] Appl. No.: 391,696

[22] Filed: Aug. 10, 1989

Related U.S. Application Data

[63] Continuation of Ser. No. 255,580, Oct. 7, 1988, abandoned.

[51] Int. Cl.⁵ .................... G03B 17/24; G03B 27/52
[52] U.S. Cl. ........................................ 355/40; 355/27; 352/92; 352/236
[58] Field of Search ................. 354/105, 106, 109, 75, 354/21; 355/27, 40, 41; 352/37, 92, 236, 241; 360/3

[56] References Cited

U.S. PATENT DOCUMENTS

| | | | |
|---|---|---|---|
| 2,937,914 | 5/1960 | Blake | 346/107 |
| 3,379,095 | 4/1968 | Kaperelian | 352/37 |
| 3,603,974 | 9/1971 | Copeland | 346/23 |
| 3,718,074 | 2/1973 | Davis | 354/109 |
| 3,736,849 | 6/1973 | Thompson | 354/106 |
| 3,797,025 | 3/1974 | Murphy, Jr. et al. | 354/77 |
| 3,807,851 | 4/1974 | Knox et al. | 353/120 |
| 3,810,218 | 5/1974 | Millett | 354/204 |
| 3,828,356 | 8/1974 | Wiers | 346/108 |
| 3,843,956 | 10/1974 | Kauneckas | 354/108 |
| 3,889,281 | 6/1975 | Taguchi et al. | 354/109 |
| 3,971,049 | 7/1976 | Ohmori et al. | 354/127 |
| 3,995,289 | 11/1976 | Shono | 354/109 |
| 4,001,846 | 1/1977 | Kauneckas | 354/105 |
| 4,025,931 | 5/1977 | Taguchi et al. | 354/105 |
| 4,042,298 | 8/1977 | Herrmann | 355/40 |
| 4,073,588 | 2/1978 | Zangenfeind et al. | 355/41 |
| 4,074,294 | 2/1978 | Fujita et al. | 354/106 |
| 4,079,388 | 3/1978 | Takahama et al. | 354/31 |
| 4,112,444 | 9/1978 | Yonemoto et al. | 354/106 |
| 4,117,502 | 9/1978 | Takeda et al. | 354/106 |
| 4,120,572 | 10/1978 | Grallert et al. | 352/92 |
| 4,150,882 | 4/1979 | Konick | 352/39 |
| 4,182,560 | 1/1980 | Oguchi et al. | 354/106 |
| 4,199,242 | 4/1980 | Hosomizu et al. | 354/145 |
| 4,211,558 | 7/1980 | Oguchi et al. | 430/359 |

(List continued on next page.)

FOREIGN PATENT DOCUMENTS 246799A 11/1987 European Pat. Off. .
0293887 6/1988 European Pat. Off. .
2159466 6/1973 Fed. Rep. of Germany .
2746036 10/1977 Fed. Rep. of Germany .

(List continued on next page.)

OTHER PUBLICATIONS

Research Disclosure, 1984, H. J. Krall, "Magnetically Positioned Photographic Film".
Eastman Kodak Company, Data Code Magnetic Control Surface, 1983.

Primary Examiner—A. A. Mathews
Attorney, Agent, or Firm—James A. Smith

[57] ABSTRACT

A virtually transparent magnetic layer is included as an additional layer in a color negative film. Information exchange between various users of the film—such as (for example) the film manufacturer, the camera user, the dealer and photofinisher—is carried vai plural longitudinal magnetic tracks on the film that being and end within each individual frame. Each track is dedicated to the writing and reading of a predetermined set of parameters relating to the corresponding frame. The photofinisher-dedicated tracks fill the image-bearing area of each frame. The film has only a single film perforation along one edge for each frame. The camera-dedicated tracks lie along the edges of the film between the film perforations. Each track begins and ends within a single frame, and is divided into a plurality of fields. The spatial relationship between the start location of the tracks associated with each film frame and the corresponding perforation determines the spatial relationship between the magnetic heads and the perforation sensor in the photofinishing apparatus.

8 Claims, 11 Drawing Sheets

U.S. PATENT DOCUMENTS

| | | | |
|---|---|---|---|
| 4,215,920 | 8/1980 | Butler | 352/92 |
| 4,235,544 | 11/1980 | Yamada et al. | 354/106 |
| 4,270,853 | 6/1981 | Hatada et al. | 354/76 |
| 4,270,854 | 6/1981 | Stemme et al. | 354/76 |
| 4,327,979 | 5/1982 | Tominaga et al. | 354/105 |
| 4,340,286 | 7/1982 | Carr | 354/105 |
| 4,344,683 | 8/1982 | Stemme | 354/106 |
| 4,349,272 | 9/1982 | Holthusen | 355/69 |
| 4,358,805 | 11/1982 | Stemme et al. | |
| 4,361,388 | 11/1982 | Mlcak et al. | 354/106 |
| 4,362,369 | 12/1982 | Kazami et al. | 354/106 |
| 4,365,882 | 12/1982 | Disbrow | 354/106 |
| 4,368,967 | 1/1983 | Imura | 354/106 |
| 4,384,771 | 5/1983 | Sakurada et al. | 354/105 |
| 4,400,457 | 8/1983 | Johnson | 430/140 |
| 4,422,752 | 12/1983 | Thurm et al. | 355/41 |
| 4,437,742 | 3/1984 | Taniguchi | 354/21 |
| 4,443,077 | 4/1984 | Tanikawa | 354/21 |
| 4,482,924 | 11/1984 | Brownstein | |
| 4,493,547 | 1/1985 | Bridges | 354/424 |
| 4,497,552 | 2/1985 | Howard et al. | 354/106 |
| 4,500,183 | 2/1985 | Tanikawa | 354/21 |
| 4,511,229 | 4/1985 | Schwartz et al. | 354/20 |
| 4,515,452 | 5/1985 | Tsuzuki | 354/106 |
| 4,544,259 | 10/1985 | Kanaoka et al. | 355/1 |
| 4,548,492 | 10/1985 | Kanaoka et al. | 355/50 |
| 4,553,833 | 11/1985 | Kanaoka et al. | 355/40 |
| 4,554,591 | 12/1985 | Kee | 358/256 |
| 4,574,319 | 3/1986 | Konishi | 358/335 |
| 4,577,961 | 3/1986 | Terashita | 355/77 |
| 4,583,831 | 4/1986 | Harvey | 354/106 |
| 4,613,911 | 9/1986 | Ohta | 360/3 |
| 4,659,198 | 4/1987 | Beauviala et al. | 352/92 |
| 4,659,213 | 4/1987 | Matsumoto | 355/38 |
| 4,684,229 | 8/1987 | Utsugi | 354/106 |
| 4,689,696 | 8/1987 | Plummer | 358/333 |
| 4,702,580 | 10/1987 | Denner | 354/106 |
| 4,705,372 | 11/1987 | Lapeyre | 354/106 |
| 4,728,978 | 3/1988 | Inoue et al. | 354/289 |
| 4,736,215 | 4/1988 | Hudspeth et al. | 354/21 |
| 4,760,428 | 7/1988 | Watanabe et al. | 355/40 |
| 4,774,534 | 9/1988 | Kazumi et al. | 354/21 |
| 4,779,145 | 10/1988 | Lemelson | 360/2 |
| 4,797,713 | 1/1989 | Terashita et al. | 355/77 |
| 4,811,042 | 3/1989 | Cloutier et al. | 354/105 |
| 4,860,037 | 8/1989 | Harvey | 354/105 X |

FOREIGN PATENT DOCUMENTS

| | | |
|---|---|---|
| 22508A3 | 10/1973 | German Democratic Rep. |
| 53-106115 | 2/1977 | Japan |
| 5695232 | 12/1979 | Japan |
| 58-128893 | 1/1982 | Japan |
| 59104635 | 12/1982 | Japan |
| 59-201055 | 4/1983 | Japan |
| 6014239 | 7/1983 | Japan |
| 59-162549 | 8/1983 | Japan |
| 6053952 | 9/1983 | Japan |
| 60-185940 | 9/1985 | Japan |
| 60-185941 | 9/1985 | Japan |
| 61-246730 | 11/1986 | Japan |
| 63165835 | 12/1986 | Japan |
| 63165836 | 12/1986 | Japan |
| 62-112141 | 5/1987 | Japan |
| 62-112142 | 5/1987 | Japan |
| 2083652 | 9/1980 | United Kingdom |
| 20834418 | 7/1984 | United Kingdom |
| 2158955A | 11/1985 | United Kingdom |

FIG. I

| TRACK | FRAME 0, 26 | FRAME 1-25 |
|---|---|---|
| Gen'l | FILM TYPE IDENT | |
| C0 | ID's<br>-OWNER (20)<br>-CAMERA (15)<br>-CAMERA DEALER (20)<br>-DIRECTORY OF WRITTEN INFORMATION | CAMERA PRIMARY<br>-DATE<br>-TIME (ACTUAL, ELAPSED)<br>-ORIENTATION REVERSE WIND VS. FORWARD WIND CAMERA<br>-LUMINANCE LEVEL<br>-FLASH FIRE<br>-SERIES SCENE<br>-CAMERA ROLL #<br>-CAMERA EXPOSURE #<br>-FRAME # |
| C1 | | CAMERA SECONDARY<br>-EOS FEATURES |
| C2 | | USER INPUT |
| F0 | ID's<br>-OWNER (60)<br>-P/F DEALER ID (20)<br>-LAB (20)<br>-USER INPUT FEATURE IND.<br>-END OF ORDER FLAG | USER INPUT |
| F1 | INITIAL ORDER INFO<br>-ORDER REQUEST<br>-ROLL ID<br>-FILM TYPE<br>-COMPLETED ORDER INFO<br>-CLASSIFICATION FLAG | PROCESS INFORMATION<br>-CLASSIFICATION<br>-INSPECTION INFORMATION<br>-MAKEOVER CORRECTION<br>-PRINTS MADE |
| F2 | REORDER/MAKEOVER INFO<br>-ORDER REQUEST<br>ORDER TYPE (REO/MO)<br>OMPLETED ORDER INFO | PROCESS INFORMATION<br>-PRINTS MADE |
| F3 | FILM-TO-VIDEO TRACK | |
| F4 | ELECTRONIC PRINT PROCESSING TRACK | |
| F5-F14 | RESERVED FOR AUDIO | |

FIG. 5

EXEMPLARY ID TABLE

PRE-RECORDED BY CAMERA (ON FILM)

| | |
|---|---|
| -CAMERA OWNER IDENTIFICATION | AA |
| -CAMERA IDENTIFICATION NO. | AB |
| -ISO USED BY CAMERA | AC |
| -DEALER ID | AD |
| -REVERSE WIND | AE |
| -SPECIAL USE INSTRUCTIONS, MRO, ETC. | AF |

RECORDED AT RETAIL ORDER STATION

| | |
|---|---|
| -CUSTOMER IDENTIFICATION | GA |
| -ORDER ENTRY DATE/TIME | GB |
| -CUSTOMER CHARGE CARD NUMBER | GC |
| -RETAILER IDENTIFICATION | GD |
| -FRAME NUMBERS TO BE PRINTED | GE |
| -NUMBER PRINTS PER NEGATIVE | GF |
| -PRINT SIZE | GG |
| -MASK CHOICE | GH |
| -CROPPING INFORMATION | GI |
| -PAPER SURFACE FINISH | GJ |
| -ORDER RETURN DATE | GK |
| -METHOD OF RETURN | GL |
| -SPECIAL EFFECTS | GM |
| -SPECIAL SERVICES | GN |
| -PUSH PROCESS | GO |

RECORDED BY CAMERA AT EACH FRAME (ON FILM)

| | |
|---|---|
| -METERING FIDUCIAL | BA |
| -DATE OF EXPOSURE | BB |
| -TIME OF EXPOSURE | BC |
| -CAMERA ORIENTATION | CA |
| -f NUMBER | CB |
| -SHUTTER SPEED | CC |
| -FOCAL LENGTH | CD |
| -FLASH FIRE | CE |
| -FLASH RETURN | CF |
| -FILL FLASH RATIO | CG |
| -BACKLIT SCENE INDICATOR | CH |
| -EXPOSURE BIAS | CI |
| -SERIES SCENE | CJ |
| -ILLUMINANT COLOR TEMPERATURE | CK |
| -LUMINANCE RANGE | CL |
| -LUMINANCE LEVEL | CM |
| -SUBJECT DISTANCE | CN |
| -BEYOND CAMERA EXPOSURE RANGE | CO |
| -BEYOND MINIMUM SHUTTER RANGE | CP |
| -PSEUDO FORMAT-(TELE/PAN) | DA |
| -SCENE CLASSIFICATION | DB |
| -REVERSE WIND CAMERA | DC |
| -TEMPERATURE | DD |
| -USER INPUT | EA |
| -IDENTIFY PRINCIPAL SUBJECT | EB |
| -SUBJECT MOTION | EC |
| -CAMERA MOTION | ED |
| -STANDARD EXPOSURE | EE |
| -CAMERA FRAME NUMBER | FA |
| -CAMERA ROLL NUMBER | FB |
| -PUSH PROCESS | FC |
| -FRAME NUMBER | FD |
| -ELAPSED TIME | FE |

RECORDED AT PHOTOFINISHER

| | |
|---|---|
| PF DEALER ID | HA |
| LAB ID | HB |
| END OF ORDER FLAG | HC |
| CLASSIFICATION FLAG | HD |
| CLASSIFICATION | HE |
| MAKEOVER FLAG | HF |
| MAKEOVER CORRECTION | HG |
| UNSALVAGEABLE FLAG | HH |
| NO. OF PRINTS MADE | HI |

*FIG. 7*

SYMBOL TABLE

FIG. 8

| CHARACTER | G-BIT BYTE | | | | | |
|---|---|---|---|---|---|---|
| 0 | 0 | 1 | 0 | 0 | 0 | 0 |
| 1 | 0 | 1 | 0 | 0 | 0 | 1 |
| 2 | 0 | 1 | 0 | 0 | 1 | 0 |
| 3 | 0 | 1 | 0 | 0 | 1 | 1 |
| 4 | 0 | 1 | 0 | 1 | 0 | 0 |
| 5 | 0 | 1 | 0 | 1 | 0 | 1 |
| 6 | 0 | 1 | 0 | 1 | 1 | 0 |
| 7 | 0 | 1 | 0 | 1 | 1 | 1 |
| 8 | 0 | 1 | 1 | 0 | 0 | 0 |
| 9 | 0 | 1 | 1 | 0 | 0 | 1 |
| A | 1 | 0 | 0 | 0 | 0 | 1 |
| B | 1 | 0 | 0 | 0 | 1 | 0 |
| C | 1 | 0 | 0 | 0 | 1 | 1 |
| D | 1 | 0 | 0 | 1 | 0 | 0 |
| E | 1 | 0 | 0 | 1 | 0 | 1 |
| F | 1 | 0 | 0 | 1 | 1 | 0 |
| G | 1 | 0 | 0 | 1 | 1 | 1 |
| H | 1 | 0 | 1 | 0 | 0 | 0 |
| I | 1 | 0 | 1 | 0 | 0 | 1 |
| J | 1 | 0 | 1 | 0 | 1 | 0 |
| K | 1 | 0 | 1 | 0 | 1 | 1 |
| L | 1 | 0 | 1 | 1 | 0 | 0 |
| M | 1 | 0 | 1 | 1 | 0 | 1 |
| N | 1 | 0 | 1 | 1 | 1 | 0 |
| O | 1 | 0 | 1 | 1 | 1 | 1 |
| P | 1 | 1 | 0 | 0 | 0 | 0 |
| Q | 1 | 1 | 0 | 0 | 0 | 1 |
| R | 1 | 1 | 0 | 0 | 1 | 0 |
| S | 1 | 1 | 0 | 0 | 1 | 1 |
| T | 1 | 1 | 0 | 1 | 0 | 0 |
| U | 1 | 1 | 0 | 1 | 0 | 1 |
| V | 1 | 1 | 0 | 1 | 1 | 0 |
| W | 1 | 1 | 0 | 1 | 1 | 1 |
| X | 1 | 1 | 1 | 0 | 0 | 0 |
| Y | 1 | 1 | 1 | 0 | 0 | 1 |
| Z | 1 | 1 | 1 | 0 | 1 | 0 |
| SPACE | 0 | 0 | 0 | 0 | 0 | 0 |
| = | 0 | 1 | 1 | 1 | 0 | 1 |
| $ | 0 | 0 | 0 | 1 | 0 | 0 |
| - | 0 | 0 | 1 | 1 | 0 | 1 |
| . | 0 | 0 | 1 | 1 | 1 | 0 |
| / | 0 | 0 | 1 | 1 | 1 | 1 |

RESERVED SYMBOL TABLE

| RESERVED CHARACTER | RESERVE 6-BIT BYTE | PURPOSE |
|---|---|---|
| : | 0 0 0 0 0 1 | FILM REVERSED START SENTINEL (FIRST CHARACTER) |
| " | 0 0 0 0 1 0 | |
| # | 0 0 0 0 1 1 | |
| % | 0 0 0 1 0 1 | |
| & | 0 0 0 1 1 0 | |
| . | 0 0 0 1 1 1 | END SENTINEL (FIRST CHARACTER) AND FILM-REVERSED VERSION OF SAME |
| ~ | 0 0 0 0 0 0 | |
| ) | 0 0 0 0 1 0 | |
| * | 0 0 0 1 0 0 | |
| + | 0 0 0 1 1 0 | |
| , | 0 0 0 1 0 1 | |
| : ; | 0 0 1 1 0 0 | ID SENTINEL (USED BY ALL <u>EXCEPT</u> MFG.) |
| < | 0 0 1 1 0 1 | |
| ^ | 0 0 1 1 1 0 | |
| ? | 0 1 1 1 1 1 | START SENTINEL (FIRST CHARACTER) |
| @ | 1 0 0 0 0 0 | FILM REVERSED 2ND CHARACTER OF START SENTINEL AND END SENTINEL |
| [ | 1 1 1 0 1 0 | ID SENTINEL (USED ONLY BY FILM MFG) |
| / | 1 1 1 1 0 0 | |
| ] | 1 1 1 1 0 1 | |
| ` | 1 1 1 1 1 0 | START SENTINEL (2ND CHARACTER) AND END SENTINEL (2ND CHARACTER) |
| ¦ | 1 1 1 1 1 1 | |

FIG. 9

PHOTOFINISHING APPARATUS WITH FILM INFORMATION EXCHANGE SYSTEM USING DEDICATED MAGNETIC TRACKS ON FILM

This is a continuation of application Ser. No. 255,580, filed Oct. 7, 1988 now abandoned.

CROSS REFERENCE TO RELATED APPLICATIONS

This application discloses subject matter related to subject matter disclosed in U.S. patent application Ser. No. 255,693, filed herewith entitled "Film Information Exchange System Using Dedicated Magnetic Tracks on Film" by Robert P. Cloutier, et al.; U.S. patent application Ser. No. 255,798, filed herewith entitled "Frame-by-Frame Data Recording Film Information Exchange System Using Dedicated Magnetic Tracks on Film" by Robert P. Cloutier et al.; U.S. patent application Ser. No. 254,982, filed herewith entitled "Film Information Exchange System Using Dedicated Magnetic Tracks on Film with Virtual Data Identifiers" by Gary L. Robison; U.S. patent application Ser. No. 254,987, filed herewith entitled "Self-Clocking Encoding/Decoding Film Information Exchange System Using Dedicated Magnetic Tracks on Film" by Michael L. Wash, et al.; U.S. patent application Ser. No. 255,006, filed herewith entitled "Order Entry Process for Magnetically Encodable Film with Dedicated Magnetic Tracks" by Gary L. Robison, et al.; U.S. patent application Ser. No. 255,882, filed herewith entitled "Printing and Makeove Process for Magnetically Encodable Film with Dedicated Magnetic Tracks" by Gary L. Robison, et al.; U.S. patent application Ser. No. 255,891, filed herewith entitled "Finishing Process for Magnetically Encodable Film with Dedicated Magnetic Tracks" by Gary L. Robison, et al.; U.S. patent application Ser. No. 255,578 filed herewith entitled "Data Alignment Circuit And Method For Self-Clocking Encoded Data" by Michael L. Wash; U.S. patent application Ser. No. 255,002 filed herewith entitled "Film-To-Video Player Using Dedicated Magnetic Tracks On Film" by Michael L. Wash; U.S. patent application Ser. No. 254,998 filed herewith entitled "Photofinishing Process With Film-To-Video Printer Using Dedicated Magnetic Tracks on Film" by Michael L. Wash; U.S. patent application Ser. No. 255,672 filed herewith entitled "Implicit Mid Roll Interrupt Protection Code For Camera Using Dedicated Magnetic Tracks on Film"; all assigned to the assignee of the present application.

BACKGROUND OF THE INVENTION

Limitations of Current Consumer Photography Technology

Communication between the camera user and the dealer or photofinisher typically requires written forms which are filled out by the user, usually well after a given scene has been photographed. Thus, in addition to the inconvenience of filling out such a form, scene-related information is typically lost or forgotten. Such information may include the user's desire to not have a particular frame printed or to have several prints made from a given frame, for example. Such information may also include the photographic parameters of the scene, observed by the user or by a sensor, which would have aided the photofinisher's classification of the scene to increase the quality of the prints made from the film.

Several factors reduce the efficiency of the overall photofinishing process. For example, in a large photofinishing laboratory not operating on a 24 hour per day basis, the film processing equipment must lie dormant for a period of time at the beginning of each work day until enough incoming customer film has been sorted to form one batch of a minimum number (e.g. 70) of film strips of the same type (such as color negative 35 mm film) to justify running the film printing equipment. Of course, undeveloped film (regular customer orders) must be separated from developed film (print re-orders).

More significant sources of inefficiency in the photofinishing process include the mechanical steps required to maintain proper correspondence between each film strip and the prints made from it, as well as the customer's identity. These mechanical steps include the sorting and handling of each form or envelope originally filled out by the customer so that the envelope follows the customer's film strip throughout the photofinishing process and winds up with the corresponding set of prints.

One of the most significant sources of inefficiency in the photofinishing process arises from the necessity of re-printing an image from a particular frame on a customer's film strip whenever inspection reveals that the corresponding original print was incorrectly made (usually by an incorrect exposure of the photosensitive print paper to the developed film negative image). In order to replace the original print with a better (so-called "make-over") print, the exposure conditions ("classification") used to make the original print from the negative film image must first be corrected. The particular film negative frame in question must be re-classified and then re-printed while preserving the original prints of the other frames. The mechanical steps involved here include notching the prints to indicate the boundaries between adjacent prints on a roll of prints and the boundaries between adjacent orders on the roll, as well as marking any original print requiring a makeover in a labor intensive procedure which insures that proper correspondence between each film strip and the corresponding original prints, makeover prints and customer order form (envelope) is never lost.

Problems to be Solved by the Invention

Recording of information on the film has been loosely suggested as one possible way around some of the limitations described above. These suggestions have ranged from optical recording of eye-readable symbols or machine readable symbols to the magnetic recording of machine readable data. Of course, optical recording on the film has only limited use, because once the film has been developed, no further recording may be done. Furthermore, the information must be restricted to those limited areas on the film not occupied by the camera-exposed image of each frame, a significant limitation on the amount of information that can be recorded.

With magnetic recording in a virtually transparent magnetic layer, high density recording may be done everywhere on the film including in the image area, so that all relevant information theoretically could be recorded with each frame on the film. However, what has not been recognized in the prior art is that complete exploitation of the potential capabilities of magnetic recording on film results in an unwieldy mass of data being recorded on the film, various bits of which must be separately accessed at various stages of the film use by camera and photofinisher. In such a scenario, the photofinisher in particular must find a certain needle of data in a massive haystack of data at a given step in the photofinishing process. For example, the classifier may require access to camera-recorded data specifying camera orientation for each frame, while the finishing station may require access to data recorded during print inspection specifying for each frame whether a makeover print was to be made. Therefore, one problem is how to record all of the required data in each frame on the film while permitting any stage of the photofinisher process to instantly access a particular piece of data in a given frame or to instantly access an area unoccupied by other data for recording of additional data.

Another problem arises if the accommodation of magnetic reading/writing on the film by both the camera and the various dealer and photofinishing stages precludes the photofinisher from reading/writing on film formats (e.g. 110 or 126 film) adapted to ordinary cameras not having magnetic read/write capability. The problem here is how to permit the photofinisher to use magnetic recording on film without regard to the format of the film or the type of camera used, using the same magnetic recording format and hardware for all cases. Solving this last problem would permit all film for all cameras to include the additional magnetic layer, for photofinishing with the same magnetic read/write format and automated protocols using the film magnetic layer as a frame-by-frame scratch pad memory.

SUMMARY OF THE INVENTION

Magnetic reading and writing of information in a virtually transparent magnetic layer in the film during each stage of film use and film processing is restricted to certain dedicated parallel tracks extending longitudinally along the length of the film, the choice of track being determined in accordance with the particular information being recorded. Each track begins and ends essentially within a single frame, and is divided into a plurality of fields. The data in each field is identified by an ID code preceeded by and ID sentinel at the beginning of the field, and the beginning and end of each track is labeled with start and stop symbols respectively. Magnetic reading/writing is performed with transport of the film by the camera during field use and during transport of the film by the dealer or photofinisher during film processing, printing, etc.

The tracks are dedicated by universal pre-arrangement to certain sets of parameters or information, each set being of particular interest to a certain stage in the use of the film, the various stages including the camera, the dealer order entry station, the photofinisher order entry station, the classifier, the printer, the inspection or re-classifier station and the enveloper-sorter station.

The photofinisher tracks occupy the principal image area of each frame, so as to maximize the number of tracks available to the photofinisher and to render the format of these tracks virtually immune to any differences between various film formats or film perforation patterns. The photofinisher tracks therefore have a universally applicable format and are useful for additional purposes, such as the recording of frame-by-frame instructions for a film-to-video player or electronic print processing.

The camera tracks are present only in film adapted for use in cameras having magnetic read/write capability. For this purpose, the camera tracks are accommodated along the film edges, without impacting the photofinisher track locations, by interruption of the usual film perforation pattern along the film edges. In the preferred embodiment, each perforation is located next to the image area—one perforation per frame, while the camera tracks are located within each frame along the film edges between successive perforations. This feature accommodates camera tracks without reducing the number of recording tracks on the film for all other uses, while at the same time permitting the photofinisher tracks to have the same format and configuration for all types of film.

The concept of one uniquely identifiable perforation for each film frame plays a key role in the magnetic reading and writing process. The film frame is located by a perforation sensor—such as a gear tooth engaging the perforation—with respect to a stationary magnetic head. This permits the recording operation to be controlled so that all tracks in a given frame start at a common fixed longitude having a predetermined location with respect to the corresponding film perforation. As a result, any apparatus may find the track start location using its own perforation sensor having the correct spatial relationship with its own magnetic head. The spacings "D" and "DD" need not necessarily be identical, since some differences may be necessary to account for electronic time delays with respect to the magnetic head or the perforation sensor.

In a preferred embodiment of the invention, the various types of information are allocated among the dedicated tracks in accordance with groups of related information types or parameters, some individual groups being used by more than one stage of the film use cycle. Furthermore, in this preferred embodiment, information common to all frames of the film is in dedicated tracks on the film leader. Specifically, general information such as film type, camera type, owner identification, a directory of written information and the like are recorded in a first camera track (near one film edge) on the film leader. This first camera track is designated track C0 while the film leader is designated frame 0. Scene related parameters automatically sensed by the camera (such as scene luminence, camera orientation, color temperature, flash fire, etc.) are recorded in track C0 in each subsequent frame (e.g. frames 1–25). A second camera track, track C1, is dedicated to the recording of secondary information, such as shutter speed, aperture size, etc. Clearly, an intelligent photofinishing classifier station, in attempting to compute the optimum exposure conditions to make a print, would read the data on track C0 in each of frames 1 through 25 (for example), while a photofinisher finishing station, in attempting to maintain correspondence between a customer's film and his order form or envelope, would read the data on track C0 in frame 0. A similar sort of allocation of photofinisher dedicated tracks is employed, with customer print order request data being recorded in a first photofinisher track (F0) in frame 0, process data such as image classificiation and the number of prints made being recorded by frame in track F1, frames 1–24 (for example). The makeover correction, if any, is recorded in track F02. A summary of makeover data (e.g. total number of makeover prints) is recorded in track F2 in frame 0. Other photofinisher tracks may be dedicated to uses other than photofinishing, such as frame-by-frame user instructions for film-to-video players.

Solution to the Problems

The invention solves the data access problem faced by (among others) the photofinisher of "finding a needle in a haystack" because each stage need merely know which track has been dedicated to the data relevant to that stage, and may read the data from that track while ignoring all other data magnetically recorded on the film. Furthermore, in some cases the reading of data can be dispensed with entirely in order to make certain basic determinations about the film, by simply determining whether certain tracks are empty or not. For example, whether a particular strip of film has already been developed (and therefore was submitted for print reorder) is readily determined by seeing whether or not certain tracks (e.g. track F1 of frames 1–24) contain recorded data or not.

The invention solves the problem of making the photofinisher track format and the photofinisher magnetic read/write system universally applicable to all film formats, while maximizing the number of non-camera tracks, by placing the camera tracks at the film edges between perforations on special film having one perforation per frame. This is important, since the amount of data which may be read or written by the photofinisher to enhance his process efficiency (and by later stages in film use such as a film-to-video player) is far greater than data recorded by the camera. Of even greater importance is the fact that making the photofinisher's magnetic recording format of universal application permits him to employ the techniques of the invention for all magnetically coated films, not just films used by a camera having magnetic recording capability, thus requiring no new customer purchases in order to universally exploit the invention with all film types.

DESCRIPTION OF THE DRAWINGS

The invention may be understood by reference to the accompanying drawings, of which:

FIG. 5 is a block diagram illustrating the architecture of a read only memory containing a directory of track locations for various parameters which may be magnetically written or read on the film, in accordance with the dedicated track format of FIG. 1;

FIG. 7 illustrates an exemplary data identification code table for universal use with the data format of FIG. 6 by all stages of film use including camera and photofinisher;

FIG. 8 illustrates an exemplary symbol table for universal use with the data format of FIG. 6 by all stages of film use including camera and photofinisher;

FIG. 9 illustrates an exemplary reserved control symbol table for universal use with the data format of FIG. 6 by all stages of film use including camera and photofinisher;

DETAILED DESCRIPTION OF THE INVENTION

Preferred Format of the Dedicated Tracks on Film

Figure 1:
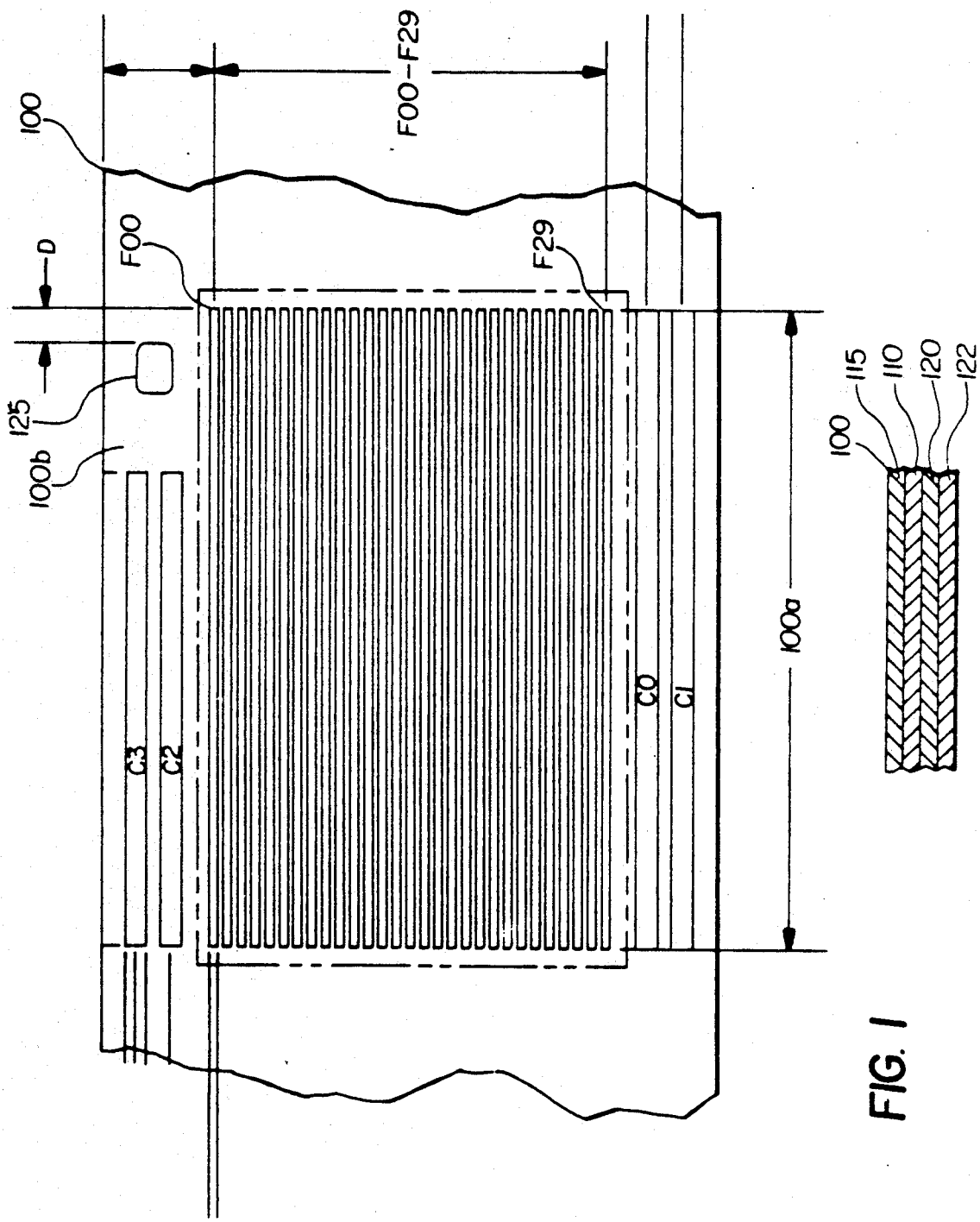
FIG. 1 is a diagram illustrating the parallel dedicated tracks in a virtually transparent magnetic layer on film having a special perforation format particularly adapted for use in cameras having a magnetic film read/write capability.

Referring to FIG. 1, a strip 100 of color negative film 35 millimeters wide includes a base 110, various well-known photo-chemical layers 115 on one side of the base 110 and a virtually transparent magnetic layer 120 on the other side. An anti-static and lubricating layer 122 covers the magnetic layer. The film strip 100 includes perforations 125 spaced along the film edge at regular intervals matching the pitch of a metering pawl in a camera adapted to use the film strip 100.

For purposes of recording data in the magnetic layer 120, each frame of the film strip 100 is divided into a plurality of predetermined parallel longitudinal track locations where magnetic tracks of data may be recorded. Each of the tracks is preferably labeled as shown in FIG. 1. In particular, the two outermost tracks along each edge of the film strip 100 are tracks C0, C1 and tracks C2, C3, respectively. The thirty innermost tracks are tracks F00 through F29. Each one of the outermost tracks C0 through C3 is dedicated to the recording of a particular type of information by a camera having magnetic recording capability, in accordance with a pre-arrangement universally established for all cameras and photofinishers. In a similar manner, each one of the innermost tracks is dedicated to the recording of a particular type of information by a particular type of photofinishing (or other) equipment, in accordance with the above-referenced universal pre-arrangement.

In order to accommodate the presence of the camera tracks C0 through C3 along the film strip edges, the perforations 125 are excluded from periodic imperforate edge regions 100a adjacent each exposed frame, and are restricted to intermediate regions 100b. In the embodiment of FIG. 1, there is only one perforation in each intermediate region 100b. In the preferred embodiment, perforations lie along only one edge of the film strip 100.

The film perforation-to-track spacing "D" illustrated in FIG. 1 determines the spatial relationship between a film perforation (or tooth) and a magnetic head used in a magnetic read and write system. Such a system would be included in photofinishing apparatus such as that illustrated in FIG. 10, wherein the spacing "DD" shown between a stationary magnetic head 940a and a perforation sensor (or tooth) 941 tracking film transport in a printer 940 corresponds to the perforation-to-track spacing D of FIG. 1. This guarantees quick access to the start location of a given track in a given frame on the film. The camera of FIG. 2 has a similar spacing "DDD" between its head 210 and perforation sensor (tooth) 206.

Use of Dedicated Film Tracks in a Camera

Figure 2:
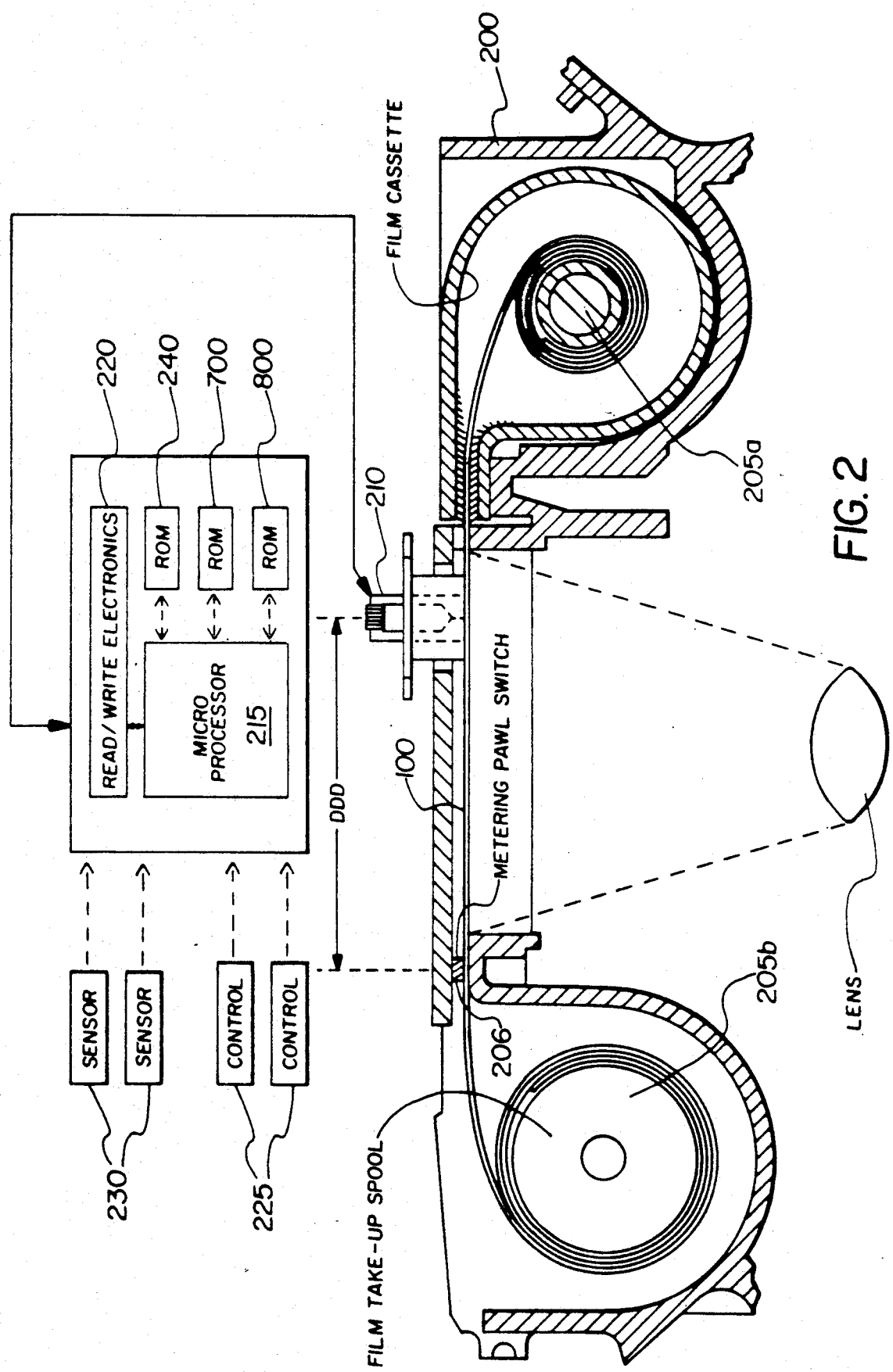
FIG. 2 is a simplified diagram illustrating the concept of a camera adapted to read or write data on the film of FIG. 1.

Referring to FIG. 2, a camera 200 transports the film strip 100 between the reels 205a,b, of a film cartridge and a take-up reel, respectively, conforming to the format of the perforations 125 of FIG. 1. The camera 200 includes a magnetic read/write head 210 in near proximity with the magnetic layer 120 on the unsensitized side of the film strip 100. A microprocessor 215 controls magnetic data recording or playback by the head 210 through head electronics 220.

The microprocessor 215 may accept order information to be magnetically recorded on the film strip 100 from the camera user through camera controls 225, such information pertaining to the number of prints desired for a given frame, by frame number, for example, or the name and address of the camera user for ultimate use by the photofinisher. The microprocessor 215 may also accept scene related information from scene sensors 230 to be magnetically recorded on the film strip 100 for ultimate use by the photofinisher. Such information may include camera orientation, scene luminence and the like.

The advantage of the longitudinal dedicated track format of FIG. 1 is that magnetic recording of data on the film strip 100 may be performed by the camera using a relatively stationary head (i.e. the head 210) by buffering all of the data to be recorded in a particular frame in a particular camera track and then transmitting the data to the head just as the film is being wound to the next frame.

The microprocessor 215 includes a read only memory 240 containing instructions sufficient to ensure that each type of information received is recorded in the correct one of the dedicated camera tracks C0–C3 in accordance with a universal pre-arrangement common to both the camera and the photofinisher. For this purpose, the microprocessor sorts and buffers each piece of information in compliance with the instructions stored in the read only memory 240. The nature of this pre-arrangement and the architecture of the read only memory will be described below in this specification.

Dedicated Tracks Format for Ordinary Cameras and Film

Figure 3:
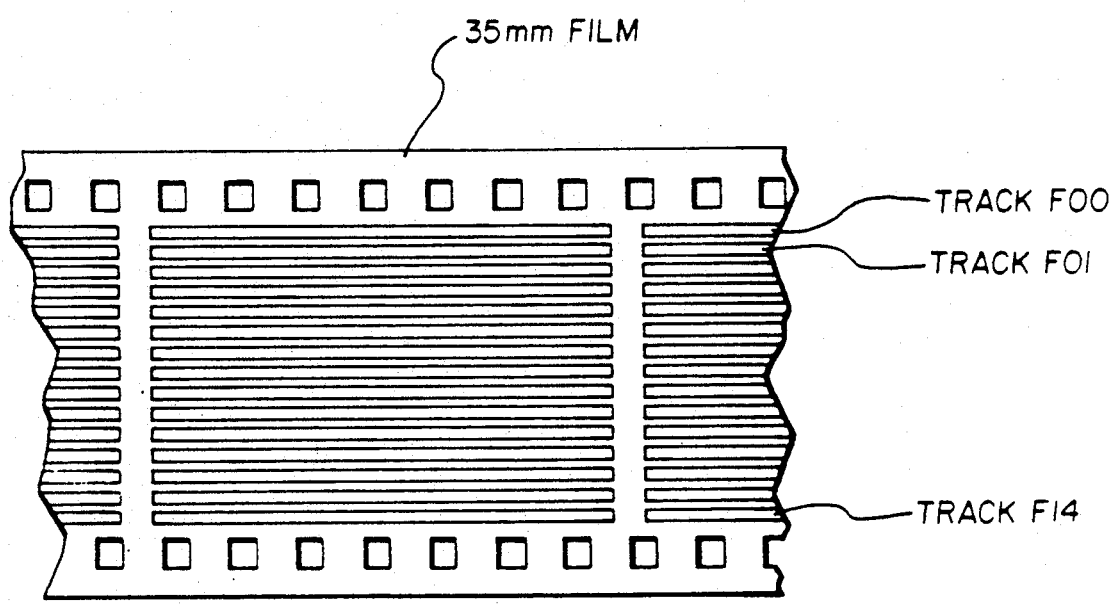
FIG. 3 is a diagram illustrating the parallel dedicated tracks in a virtually transparent magnetic layer on film having the currently ubiquitous perforation format used in ordinary cameras not having a magnetic film read/write capability.

The format of the photofinisher tracks F00 through F29 is the same regardless of the placement of the film perforations 125 of FIG. 1. Thus, a photofinisher may employ the same magnetic recording protocols and hardware on all types of film provided that a virtually transparent magnetic layer (such as the layer 120 of FIG. 1) is included in all types of film. Thus, referring to FIG. 3, ordinary 35 mm color negative film having the now-standard pattern of closely spaced perforations along both film edges accommodates the photofinisher tracks F00 through F29 having the same width and spacing as that of the special film format of FIG. 1. Although the perforations of FIG. 3 preclude the presence of the camera tracks C0 through C3, such film is not used in cameras having magnetic read/write capabilities and so the camera tracks need not be present. The advantage here is that all subsequent users of the film (i.e. photofinisher, film-to-video player, etc.) have been allocated the maximum number of tracks for all film formats, including those of FIG. 1 and of FIG. 3.

Camera and Photofinisher Dedicated Track Widths

Figure 4:
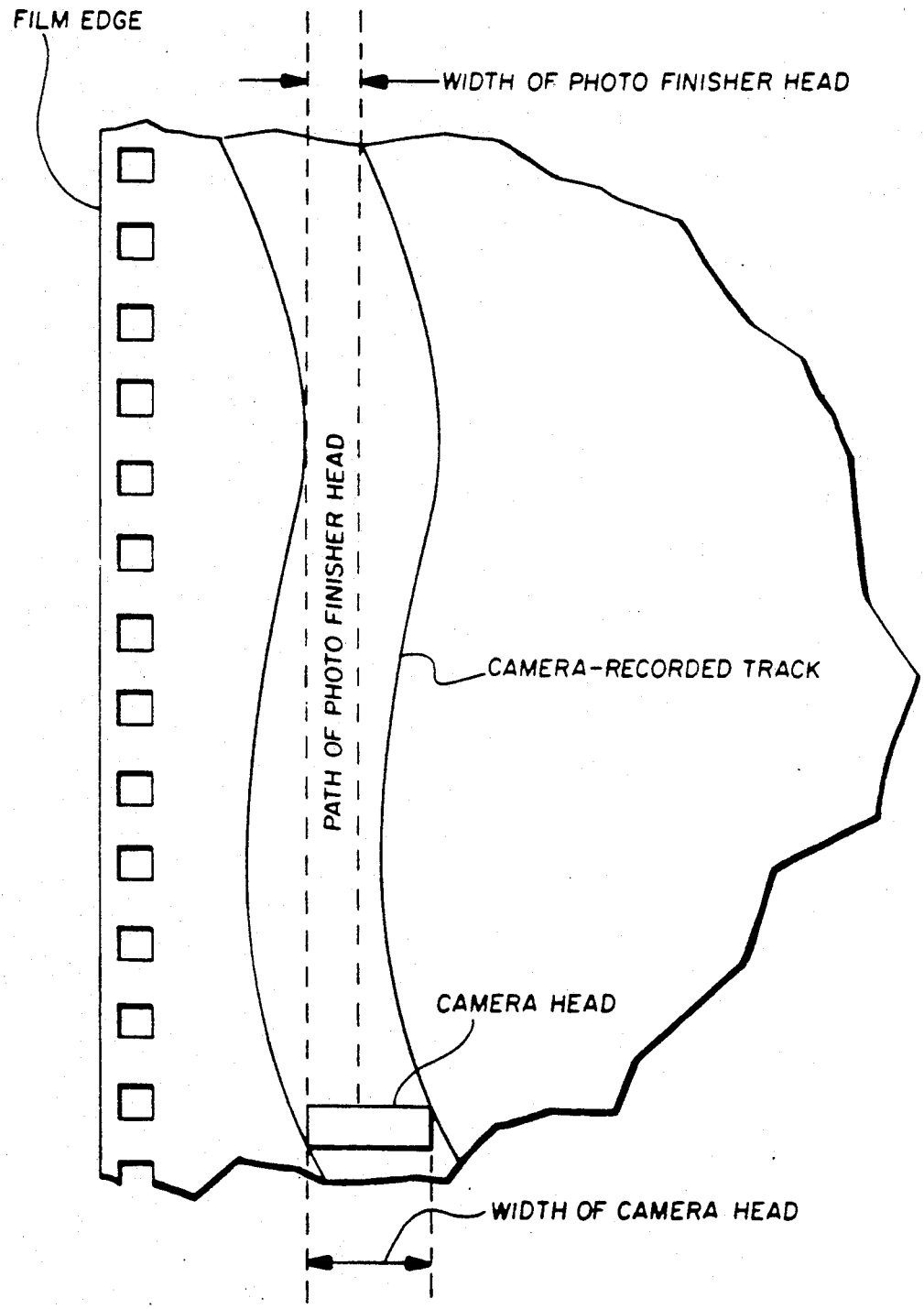
FIG. 4 is a diagram illustrating the accommodation of film wander in the camera of FIG. 2 by the use of different head widths at the various stages of film use.

Referring to FIG. 4, the width of the camera dedicated tracks C0–C3 is greater than that of the photofinisher tracks F00–F29. Of course, these track widths are controlled by the selection of the camera head widths and the photofinisher head widths. Preferably, the difference is sufficient to accommodate film wander in the camera during winding of the film while recording is performed by the head 210. Such wandering causes the camera tracks to have the meandering appearance illustrated in FIG. 4. Note in FIG. 4 that the photofinisher head, which must read the camera tracks, does not leave the camera track because it has a much smaller width.

Allocation of the Dedicated Tracks

FIG. 5 illustrates the allocation of the dedicated tracks, among the various information types, implemented by microcodes stored in the read only memory 240 of FIG. 2. There are four camera tracks and fifteen photofinisher tracks in each frame of the film exposed by the camera, these frames being designated frames 1 through 25. The film leader and trailer are designated frames 0 and 26, respectively. In general, the information recorded in frames 0 and 26 pertains to the film strip 100 as a whole, while the information recorded in each of frames 1 through 25 is unique for a particular frame. In FIG. 5, three of the four camera tracks are used by the camera, while three of the thirty photofinisher tracks are used by the photofinisher. The rest of the photofinisher tracks are reserved for the recording of film-to-video player instructions (track F03), electronic print processing instructions (track F04) and audio (track F05 through F14). The remaining tracks (F15–F29) are reserved for unforeseen purposes.

Each of the tracks is dedicated to a particular group of information types which would in most cases be written or read together. Thus, frame 0 track C0 is reserved for information relating to the owner and the camera for recording by the camera. Similarly, frame 0 track F00 is reserved for information relating to the owner and the photofinisher for recording by the photofinisher. Likewise, track F00 of frame 0 is reserved for recording by the photofinisher—or by an order entry station—of the customer's instructions, the film type, and related information pertaining to the treatment of the order. Track F02 of frame 0 is reserved for the recording of historical information regarding the locating of frames requiring makeover prints and print reorders by the customer, for use by the photofinisher during a subsequent print reorder by the customer.

Track C0 of each exposed frame (frames 1–25) is reserved for scene-related information for recording by the camera, such as scene luminence, camera orientation and the like. Similarly, track F01 is reserved for photofinisher information unique to a particular exposed frame such as the classification of the negative image (determination of the proper print exposure), number of prints made, etc. Any makeover classification correction is recorded on track F02.

The embodiment of FIG. 5 does not take into account all of the information types which may be magnetically recorded by the camera, retail order station or photofinisher on the film. However, the embodiment of FIG. 5 is an example of the manner in which all information types may be classified as to which track each one is to be assigned. The principle underlying the manner in which each information type is assigned to a particular track is that all information related to a particular transaction should be recorded on the same track, so that that track is dedicated to being written or read during those operations associated with that transaction.

The various transactions provided for in the embodiment of FIG. 5 are: (a) recording of customer data, including the customer address; (b) recording of scene-related inforamation with each exposure, including parameters characterizing lighting conditions and camera exposure settings; (c) recording by the retail order station or photofinisher of customer order information, such as the number of prints desired; (d) the recording of inspection and makeover classification correction for a given frame by the photofinisher; (e) the recording of a summary of makeover data or print reorder data applicable to the entire film roll (f) the recording of instructions for a film to video player; (g) the recording of instructions for electronic print processing; and (h) the recording of audio. In general (but not always) each of the magnetic recording tracks illustrated in FIG. 1 is dedicated to one of the foregoing transactions (a) through (h). The result is that during recording the amount of searching for an available recording location is minimized while during playback the amount of searching through data irrelevant for a particular operation is also minimized. For example, during the classification operation, in which the optimum print exposure condition for each frame is determined, all scene-related information potentially helpful in determining the proper Classification may be obtained by reading data from a single track, namely the camera-dedicated track C0 in each exposed frame (frames 1-25). No other track need be read.

Preferred Data Architecture

Figure 6:
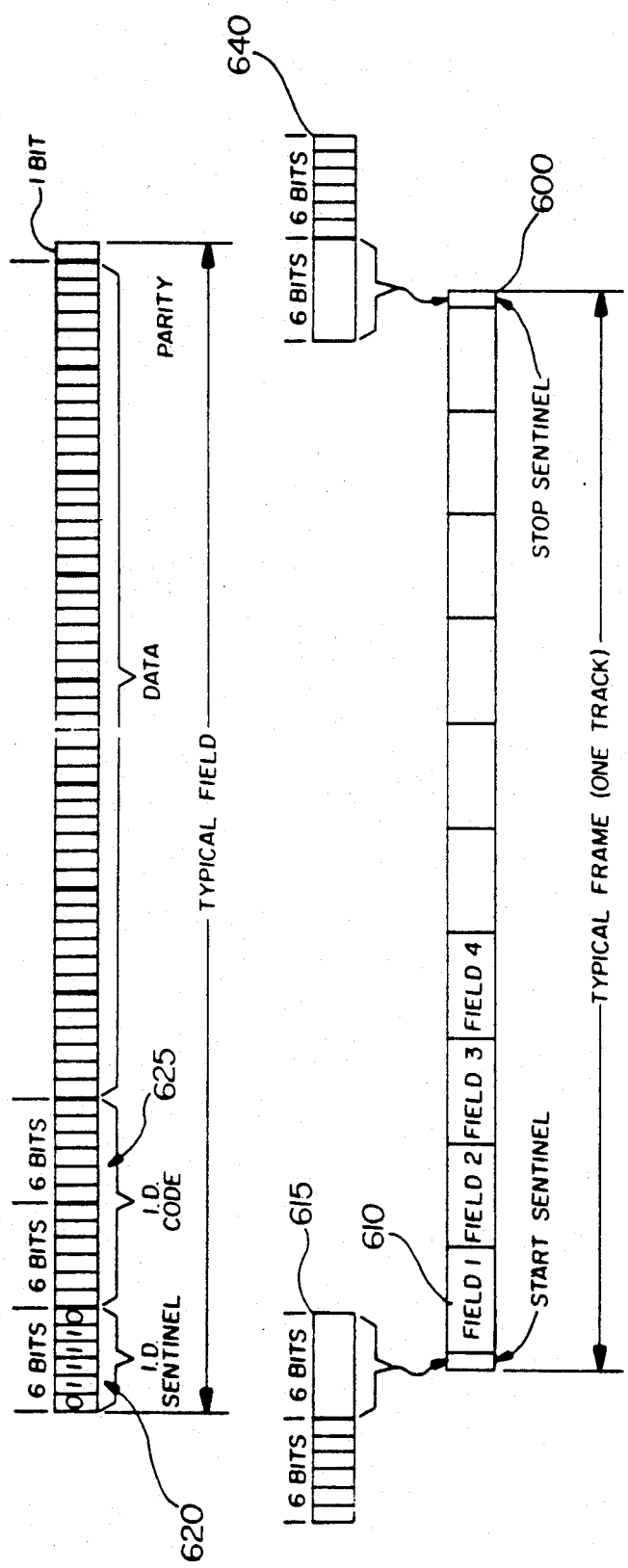
FIG. 6 is a diagram illustrating the preferred data format used in the dedicated tracks of FIG. 1 or FIG. 3.

As previously described herein with respect to FIG. 1, the data recorded magnetically on the film strip 100 is divided into frames exposed by the camera (frames 1-25) as well as the film leader (frame 0), the data within each frame being allocated among a plurality of dedicated tracks within the frame. FIG. 6 illustrates the preferred data format within each track of each frame.

In FIG. 6, each track 600 has the length of one frame and is divided into a plurality of fields 610. Each track 600 includes a predicate start sentinel 615 at its starting end (the left-hand end of the track in FIG. 6 where the head begins its scanning of the track 600). Each field includes a predicate ID sentinel 620 followed immediately by an ID code 625. The purpose of the track start sentinel 615 is to notify the read/write system in the camera or in the photofinishing hardware of the beginning location of the track 600. The purpose of the field ID sentinel 620 is to notify the same system of the beginning location of each succeeding field in the track 600. The purpose of the ID code 625 is to identify the type of information recorded in the following field.

The ID code is recorded in the beginning of each field and is determined by the information type which follows it. For example, if the camera 200 of FIG. 2 is about to record the level of scene luminence observed by sensors on the camera during exposure of the frame, the camera first causes a unique ID code to be recorded just ahead of the data representing the scene luminence level. In the simplest embodiment, a unique ID code is assigned to each parameter or information type which may be recorded on the film, so that the ID codes for all possible information types constitute a large dictionary. Inasmuch as the same dictionary must be employed by all stages in the life cycle of the film (e.g., camera, photofinisher, etc.) identical read only memories are provided at each stage, each of these memories embodying a universal ID code dictionary and controlling the reading and writing of ID codes at each stage of film use.

The advantage is that the placement of a particular parameter within the track 600 by the camera need not be previously known by the photofinisher in order for the photofinisher to be able to find that parameter on the track, since the photofinisher may simply refer to the corresponding ID code recorded by the camera. This same advantage hold between any other separate components, where one component writes data onto the film and the other independently reads the data from the film at a later time and, typically, at a different location.

One exemplary embodiment of a universal ID code dictionary is illustrated in FIG. 7. The dictionary of FIG. 7 is implemented as a set of microcodes stored in a read only memory 700 connected to the microprocessor of FIG. 2. The read only memory 700 of FIG. 7 defines a two-character ID code for each parameter which may be recorded. In this embodiment, the ID code start at AA and end at HI, as just one possible example. While FIG. 7 depicts each ID code as being associated with the name of a particular parameter, in practice each ID code would be associated with the buffer or memory location of that parameter in the recording system so as to identify the corresponding data in terms of its location prior to being recorded. A system designer may use FIG. 7, for example, to construct the actual machine language content of the read only memory 700, depending upon the particular system design employed.

The binary bits recorded for each alphanumeric symbol representing a particular piece of information (e.g. scene luminence or customer address) or for one of the two-character ID codes of FIG. 7 are defined in accordance with the table of FIG. 8 The table of FIG. 8 is represented as a set of microcodes stored in a read only memory 800 connected to the microprocessor of 215. Each alphanumeric symbol is represented by a pattern of six binary bits. The read only memory 800 defines a universal symbol dictionary which is used to perform reading and writing of data on the film at all stages of film use. The table of FIG. 8 is derived from the ASCII standard symbols.

The read only memory 800 also defines the six-bit patterns which are reserved for control purposes and which therefore may not be used for information or data. These reserved symbols are set forth in the exemplary table of FIG. 9, and include the control symbols illustrated in FIG. 6, including the start symbol 615, the ID sentinel 620, a frame stop symbol 640 and the compliments of the start and stop sentinels 615 and 640. Other symbols are reserved in FIG. 9 in order to permit the skilled system designer to exercise other read or write controls as desired.

In FIG. 2, the microprocessor 215 in the camera 200, while referring to the rad only memory 240 for the track locations of the various allowed parameters, must also refer to read only memories 700 and 800 for the universal ID code dictionary and universal symbol dictionary in order that subsequent readers of the data recorded by the camera 200 may properly interpret the data.

A six-bit parity character lies at the end of each field, as shown in FIG. 6. The first two (most significant) bits of the parity character are always 10, so that, no matter what, the parity character never assumes the value of any one of the reserved characters of FIG. 9. The middle two bits of the parity character of FIG. 6 are reserved for unforeseen purposes. The last (least significant) two bits of the parity character provide single bit (Hamming) error correction for (a) the ID code at the beginning of the field and (b) the data characters within the field, respectively.

Exemplary Use of Dedicated Tracks in Photofinishing

Figure 10:
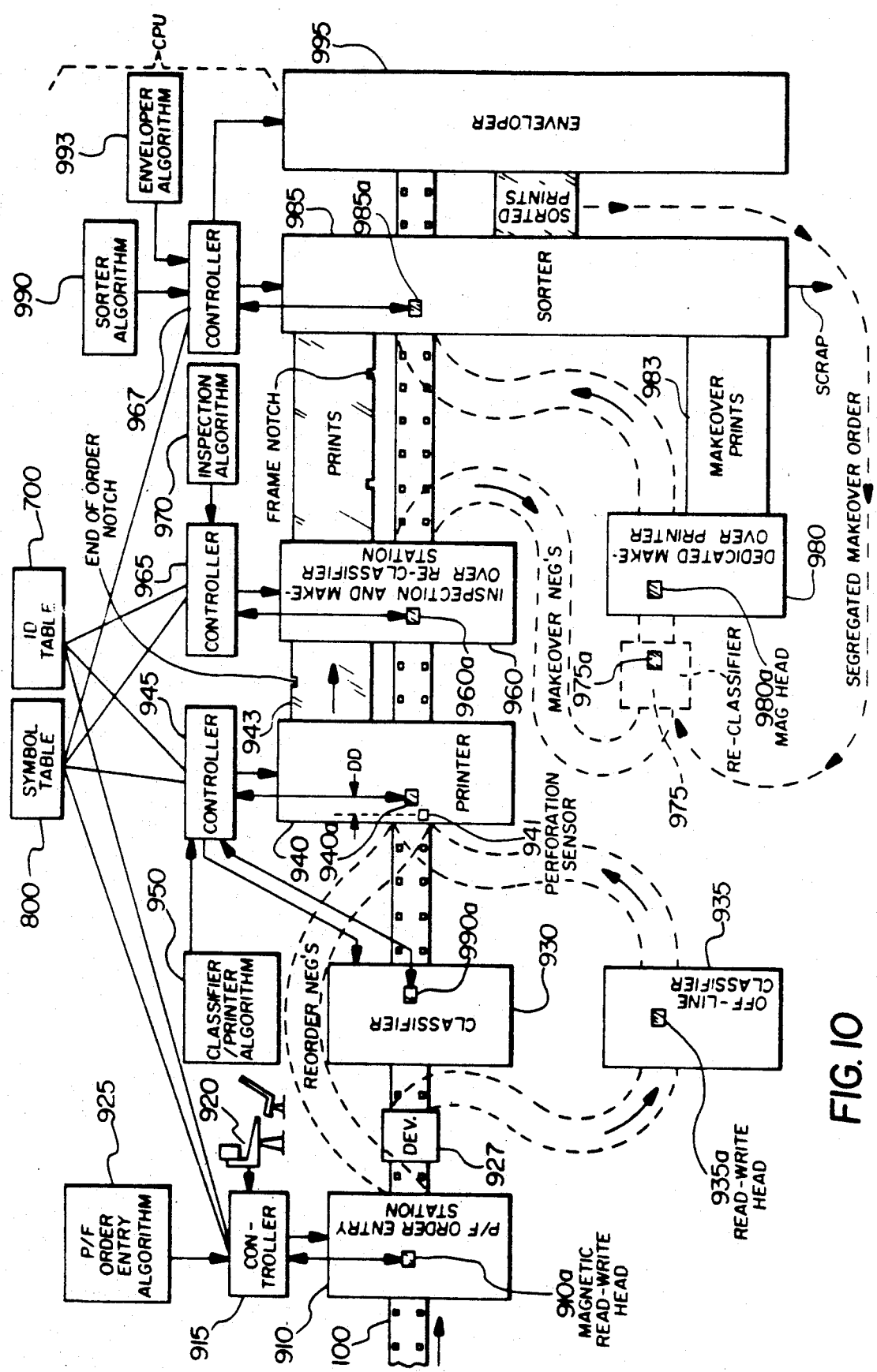
FIG. 10 is a block diagram illustrating a photofinishing system having magnetic read/write hardware including automated protocols which use the film of FIGS. 1 or 3 as a scratch pad memory for increased efficiency or performance.

Use of the dedicated film tracks for magnetic recording of information by a camera has been described with reference to the example of FIG. 2. FIG. 10 illustrates one example of the use of the dedicated film tracks (of either FIG. 1 or FIG. 3) for magnetic reading and writing in a photofinishing system. In general, such a photofinishing system employs its own version of the read only memories 240, 700, 800 for track location, an ID code dictionary and a symbol dictionary.

In FIG. 10, the film strip 100 is removed from the cartridge (or at least partially extracted to expose tis leader—frame 0) at an order entry station 910. The order entry station 910 may be located either at the dealer or at the photo-finishing laboratory. The order entry station has a magnetic read/write system including a head 910a and a controller (microprocessor) 915 which executes an order entry algorithm stored in memory 925. This algorithm defines the correct track locations in frame 0 for the recording of customer-related information, including the number of prints desired, the customer's name and address, etc., entered in at a terminal 920 or read directly from one of the camera tracks. A developer 927 develops the film strip 100 to form a negative image in each exposed frame.

Figure 11:
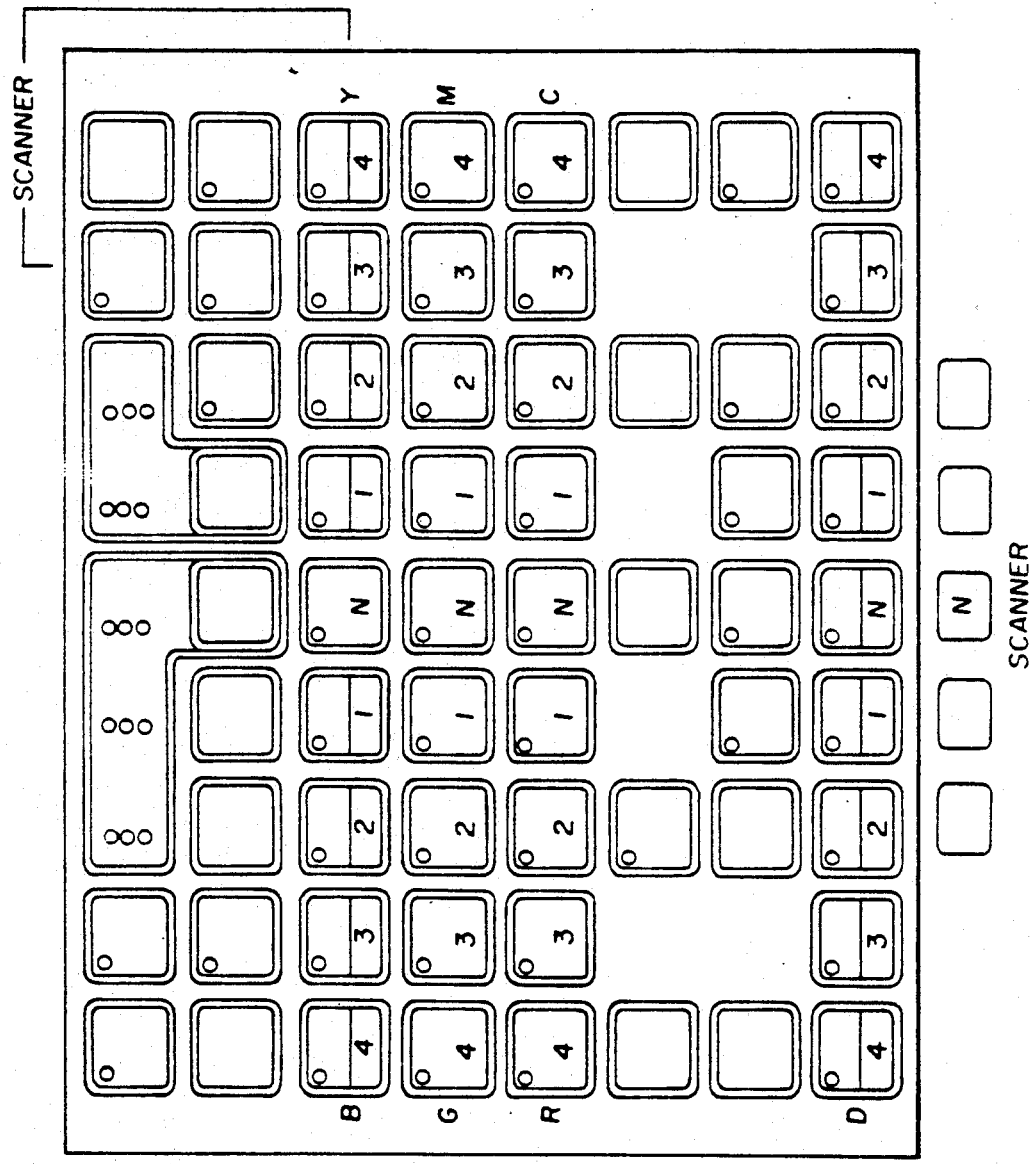
FIG. 11 illustrates a typical operator's keyboard used in the photofinishing system of FIG. 10 to classify developed negatives for correct print exposures.

The film strip 100 then enters a classifier 930 which determines the optimum print exposure condition for each frame on the film strip 100. The classifier may do this either manually under control of human operator or automatically using an image sensor axis as is done in the Eastman Kodak 3510 Color Printer or in the Eastman Kodak CLAS 35 Color Printer. An exemplary manual control terminal included in the manual version of the classifier 930 is illustrated in FIG. 11. The luminence value at which the photosensitive print paper is to be exposed through a given negative image may be changed from a nominal value (gray level) by arbitrary values −4 to +4 by pressing one of the appropriate buttons in the row of buttons labelled "D" on the left side of the terminal of FIG. 11. The intensity of red, green and blue light at which the print paper is exposed may be altered from pre-defined nominal values in similar manner by arbitrary values −4 to +4 pushing the appropriate buttons in the corresponding one of the rows of buttons labelled "R", "G" and "B", respectively. The resulting classification (defined by the luminence, red, green and blue print exposure values) is recorded by the classifier's magnetic head 930a in the appropriate one of the dedicated tracks (in accordance with the track allocation defined in a read only memory such as the memory 240 of FIG. 5).

It should be noted that if data previously recorded on the film strip 100 indicates that it has been previously developed and printed (so that a classification value is stored in each frame in the appropriate track), then the developer 927 and the classifier 930 are automatically bypassed.

A printer 940 receives the film strip 100, reads the classification previously recorded in each frame by the classifier 930, and exposes one frame in a roll of photosensitive paper 937 through the corresponding negative frame with an exposure whose characteristics meet the recorded classification. The printer 940 includes its own magnetic read/write system, such as a magnetic head 940a, a controller 945 and a memory 950 storing a classifier/printer algorithm. This algorithm governs the magnetic reading and writing by the printer 940 and classifier 930 in accordance with the dedicated tracks format of FIG. 1 or FIG. 3. For example, the printer/classifier algorithm requires the controller 945 to determine whether camera tracks (tracks C0 through C3) were previously recorded on the film strip 100. If so, the dedicated track film format of FIG. 1 applies and scene-related information (if used by the classifier 930 to enhance the accuracy of the classification operation) may be found by reading the appropriate track. Likewise, the printer/classifier algorithm in the memory 950 tells the printer 940 where to find the classification value recorded in each frame by the classifier 930.

An operator at an inspection station views each of the prints on the print roll 943 to determine whether a makeover print is required for any of them. Under control of a controller 965 which executes an inspection algorithm stored in a memory 970, data is recorded on the film strip 100 in the appropriate track by the inspection station's magnetic head 960a reflecting the necessity (if any) of a makeover print in a given frame. Presumably the makeover was necessitated by an incorrect classification, and a correction to the original classification must be computed and recorded in the appropriate track on the film strip 100. In one embodiment, this is done by the inspection station 960 itself, while in another embodiment this is done at a separate re-classifier 975 having its own magnetic recording head 975a and recording system for this purpose. The film strip 100—which may be included in a roll of many such film strips—is sent to a makeover printer 980, typically by transferring the entire roll. The makeover printer 980 has its own magnetic read/write system, including magnetic head 980a, with which it may read the appropriate data in the appropriate tracks to determine which of the frames require makeover prints and, for each one of these, what the original classification value was and what the classification correction is. From this information, the makeover printer exposes the appropriate frames on the film strip 100 using the corrected classification values.

A roll of makeover prints 983 produced by the makeover printer 980, the roll of prints 943 produced by the printer 940 and the roll of developed film including the film strip 100 are all fed to a sorter 985. The sorter collates the individual original and makeover prints with the corresponding film strips into complete customer orders, discarding any original prints whenever corresponding makeover prints have been made. Whether a corresponding makeover print has been made is determined by the sorter 985 through its magnetic read/write system including a controller 987 which executes a sorter algorithm stored in a memory 990 and the sorter's magnetic head 985a. The head 985a is simply directed to read the required data from the appropriate one of the dedicated tracks on the film strip 100 by the controller 987, in accordance with the track allocation illustrated in FIG. 5.

While the invention has been described in detail by specific reference to preferred embodiments thereof, it is understood that variations and modifications thereof may be made without departing from the spirit and scope of the invention.

What is claimed is:

1. In a film processing apparatus which processes a film strip characterized by successive frames, a virtually transparent magnetic layer and a plurality of spaced-apart perforations along one longitudinal edge thereof, the improvement comprising:

magnetic head means for reading or writing data in a selected one of a plurality of longitudinal tracks, each of said tracks starting and ending within a space in said magnetic layer adjacent a corresponding one of said frames with a longitudinal starting location having a predetermined spacing with respect to the location of a corresponding one of said perforations;

means for sensing individual ones of said perforations;

means for selecting one of said frames; and means for longitudinally transporting said film strip with respect to said magnetic head means until one of said perforations corresponding to said selected one frame is in registration with said perforation sensing means, wherein said perforation sensing means and said magnetic head means are characterized by a spatial and temporal relationship corresponding to said predetermined spatial relationship between said track starting location and said one perforation.

2. The improvement of claim 1, wherein said apparatus allocates different ones of said tracks to the magnetic recording or playback of data relating to different data categories, whereby each of data relating to different data categories, whereby each of said categories is addressable on said film strip in the manner of an X-Y addressable random access memory, individual ones of said perforations uniquely locating a particular one of said frames corresponding to an X address, and individual ones of said tracks within a frame corresponding to a Y address.

3. In a film processing apparatus adapted to process a photographic film strip for the generation of prints therefrom, said film strip being characterized by successive frames and a plurality of perforations in said strip located sufficiently near one longitudinal edge thereof so as to be outside of image areas of said successive frames thereof, the improvement wherein said film strip comprises:

a virtually transparent magnetic layer;

a plurality of longitudinal tracks magnetically recorded, each of said tracks starting and ending within a length in said magnetic layer adjacent a corresponding one of said frames with a longitudinal track starting location having a predetermined spacing with respect to the location of a corresponding one of said perforations; and said film processing apparatus comprises:

magnetic head means for reading or writing data in a selected one or ones of said tracks;

means for sensing individual ones of said perforations;

means for selecting one of said frames; and means for longitudinally transporting said film strip with respect to said magnetic head means until one of said perforations corresponding to said selected one frame is in registration with said perforation sensing means, wherein said perforation sensing means and said magnetic head means are characterized by a spatial and temporal relationship corresponding to said predetermined spatial relationship between said track starting location and said one perforation.

4. In a film processing apparatus adapted to process a photographic film strip for the generation of prints therefrom, said film being characterized by successive frames, the improvement wherein said film strip comprises:

a virtually transparent magnetic layer;

a plurality of perforations in said strip located sufficiently near one longitudinal edge thereof so as to be outside of image areas of said successive frames thereof, there being only one perforation along said one edge for each one of said successive frames;

a plurality of longitudinal peripheral tracks magnetically recorded in said magnetic layer and located sufficiently near one of the longitudinal edges of said film strip so as to be outside of said successive frames, each of said peripheral tracks starting and ending within the length of a corresponding one of said frames whereby each track is generally adjacent a corresponding one of said frames, different ones of said peripheral tracks containing magnetically recorded data relating to different data categories to which respective ones of said tracks have been dedicated; and a plurality of longitudinal interior tracks magnetically recorded in said magnetic layer and starting and ending within each one of said frames, whereby each of said interior tracks begins and ends within a corresponding one of said frames, different ones of said interior tracks containing magnetically recorded data relating to different data categories to which respective ones of said tracks have been dedicated, wherein said interior and peripheral tracks are characterized by a common starting location within each of said frames, said starting location having a predetermined spatial relationship with a corresponding one of said perforations; and said film processing apparatus comprises:

magnetic head means for reading or writing data in a selected one or ones of said tracks;

means for sensing individual ones of said perforations;

means for selecting one of said frames; and means for longitudinally transporting said film strip with respect to said magnetic head means until one of said perforations corresponding to said selected one frame is in registration with said perforation sensing means, wherein said perforation sensing means and said magnetic head means are characterized by a spatial and temporal relationship corresponding to said predetermined spatial relationship between said track starting location and said one perforation.

5. The improvement of claim 4 wherein said peripheral tracks are wider while said interior tracks are narrower so as to accommodate lateral film wander during writing of said peripheral tracks, said peripheral tracks being dedicated to the writing of data with a relatively large amount of lateral film wander and said interior tracks being dedicated to the writing of data with a relatively small amount of lateral film wander.

6. The improvement of claim 4 wherein said peripheral tracks are dedicated to the reading and writing of such data therein with some destruction of said photosensitive layers in regions in registration with said peripheral tracks; and said interior tracks are dedicated to the reading and writing of such data therein with no destruction of said photosensitive layers within said frames.

7. The improvement of claim 6 wherein said interior tracks are formed by a magnetic head recording process in which a magnetic head records data but does not contact said film strip with sufficient force to substantially harm said photosensitive layer, while said peripheral tracks are formed by a magnetic head recording process in which a magnetic head records data while not always avoiding contact with said film strip with sufficient force to substantially harm said photosensitive layer.

8. The improvement of claim 4 wherein a time delay is interposed between the sensing of a corresponding one of said perforations by said perforation sensing means and transmission of data from or to said magnetic head means, the combination of the length of said time delay and the spatial relationship between said magnetic head means and said perforation sensing means being equivalent to said predetermined relationship between said perforation and said track starting location, whereby said track start location of a chosen frame is registrable with said magnetic head means by indexing the corresponding one of said perforations with said perforation sensing means.

* * * * *

UNITED STATES PATENT AND TRADEMARK OFFICE
CERTIFICATE OF CORRECTION

PATENT NO. : 5,029,313
DATED : July 2, 1991
INVENTOR(S) : Gary L. Robison and Michael L. Wash It is certified that error appears in the above-indentified patent and that said Letters Patent is hereby corrected as shown below:

Title page, item [57] Abstract line 5, "vai" should read --via;
line 6, "being" should read --begin--.

Col. 1, line 30, "255,882" should read --255,892--; line 31, "Makeove" should read --Makeover--.

Col. 10, line 26, "code" should read --codes--; line 41, "8" should read --8.--; line 62, "rad" should read --read--.

Col. 13, line 38 and 39, delete "whereby each of data relating to different data categories".

Col. 15, line 2, "regions in" should read --regions thereof in--.

Signed and Sealed this

Twentieth Day of July, 1993

Attest:

MICHAEL K. KIRK

Attesting Officer     Acting Commissioner of Patents and Trademarks